R. M. Hoe. Sheet 1. 2 Sheets.
Type Bed.
No. 3893. Reissued Mar. 22. 1870.
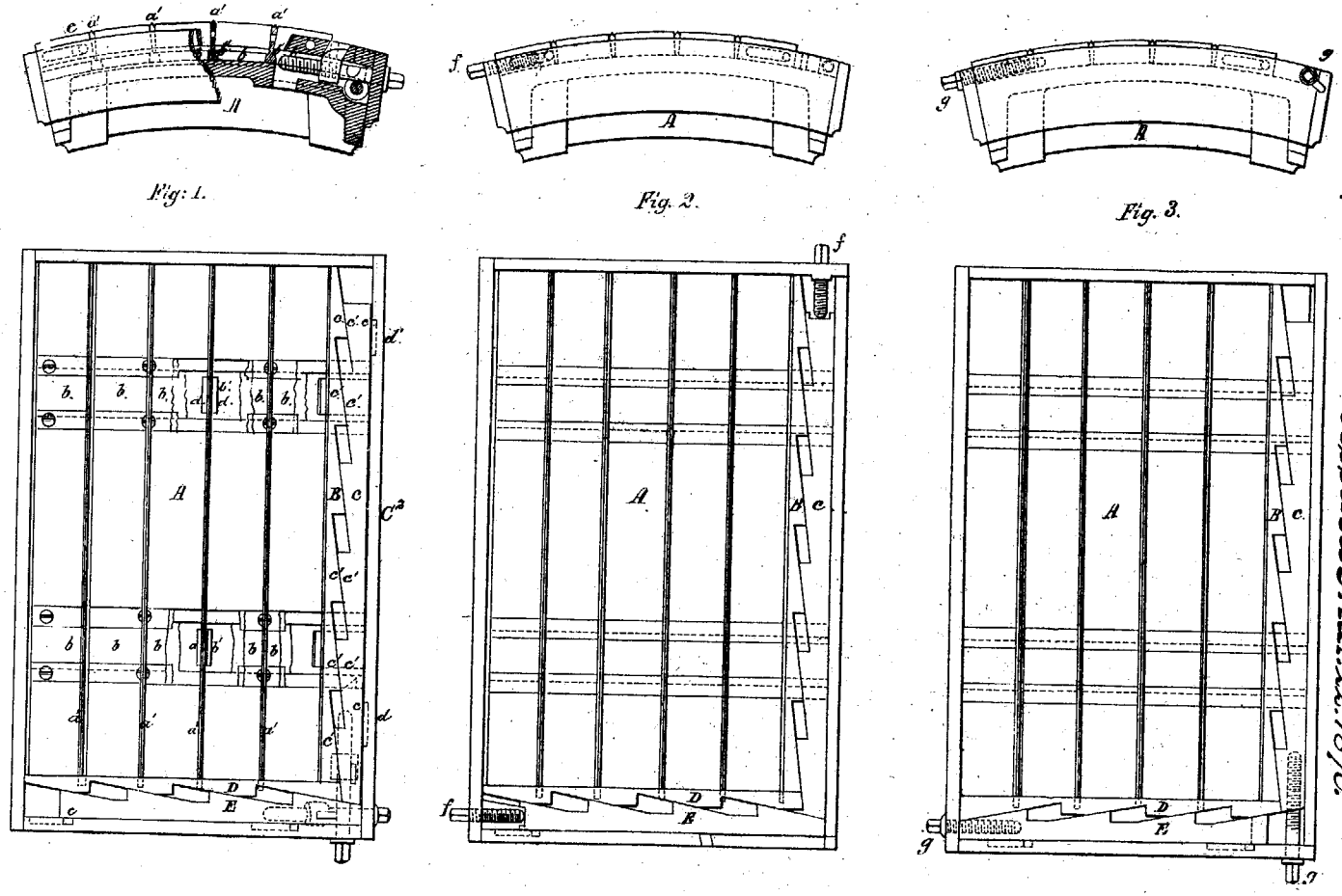

R. M. Hoe. Sheet 2. 2 Sheets.
Type Bed.
No. 3,893. Reissued March 22, 1870.
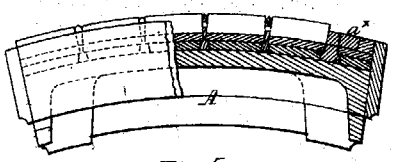
Fig. 5.
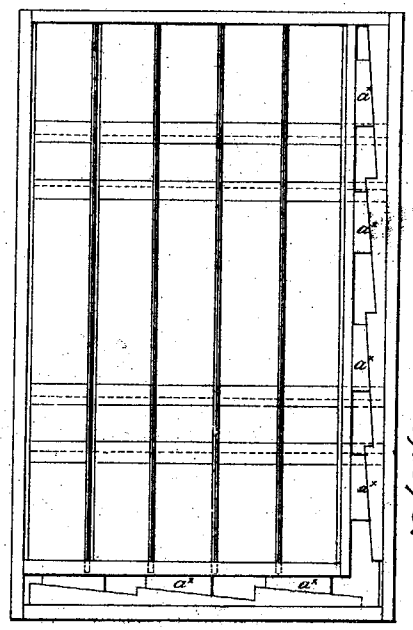
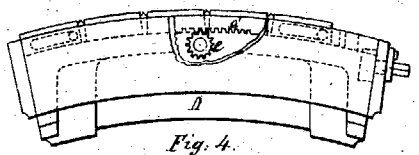
Fig. 4.
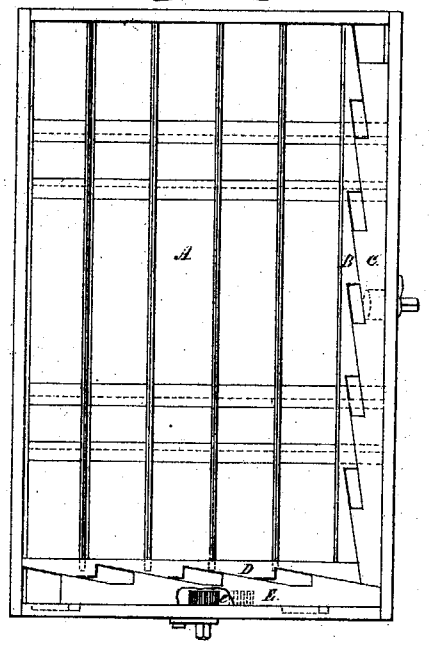

United States Patent Office.

R. HOE & COMPANY, OF NEW YORK, N. Y., ASSIGNEES OF RICHARD M. HOE.

*Letters Patent No.* 15,501, *dated August* 5, 1856; *reissue No.* 3,893, *dated March* 22, 1870.

IMPROVEMENT IN PRINTING-PRESSES.

The Schedule referred to in these Letters Patent and making part of the same.

Be it known that RICHARD M. HOE, of the city, county, and State of New York, did invent certain new and useful Improvements in Printing-Presses, of which the following is a specification.

*Nature and Objects of the Invention.*

The invention consists in a novel construction, arrangement, and combination of parts for securing column-rules and sections of type to a rotary bed, as will be fully described hereafter.

*Description of the Drawings.*

Figures 1, 2, 3, 4, and 5 represent in each a face and end view of a segment of a revolving type-bed, with my improvements embodied therein.

*General Description.*

In the annexed drawings—

A represents a type-bed, with grooves for receiving the feet *a* of the column-rules *a'*, in which the former are held securely by means of the intermediate pieces or plates *b*, which fit over the ledges or shoulders *b'* of the feet *a*, and serve as keys, as clearly shown in the transverse section in fig. 1. The exterior surface of the keys *b* is flush with the surface of the bed A.

B C are two flat pieces of metal, having each one straight edge, while the opposite sides are cut so as to form a series of oblique, wedge-shaped projections, $c^1$, parallel one with the other, and operating precisely in the same manner as a simple wedge and gib. The only object in cutting the edges of the strips B C into several projections, as shown, is to reduce the movement or travel of the piece C, which is the wedge. The gib-piece B is secured to the surface of the bed by means of feet projecting into the rebates or grooves, and by being overlapped by the intermediate pieces or keys *b*, in the same manner as the column-rules.

The wedge-piece C is prevented from falling out by the insertion of pins *c* projecting from the side, in contact with the plate $c^2$, and entering grooves *d* in said side plate, in which the pins are allowed sufficient travel, but by which the wedge is confined to the bed.

D E are metal strips similar to B C, respectively, excepting that, instead of being flat, they are curved to conform to the surface of the bed. The wedge E is held in its position in the same manner as the wedge C, but the gib D is secured by mortises made in it opposite the ends of the column-rules, for the reception of tenons on the ends of the said column-rules made for that purpose.

The foregoing description applies to all the figures, the only difference in them being in the manner of driving or drawing the wedges.

In fig. 1 the wedges are drawn by means of screws underneath the surface of the bed, the nuts having projecting nibs traversing slots in the surface of the bed, extending into mortises in the ends of the wedge-pieces E and C.

In fig. 2 the wedges are pushed forward by screws *f f* being tapped into the end or side plates, with their points in contact with the rear ends of the wedges E and C.

In fig. 3 the wedges are drawn by the screws *g g*, which are tapped into the end of the wedges, after passing through holes in the side or end plates, the screws having shoulders on the outside to give the resistance.

In fig. 4 the wedges are urged forward by means of toothed pinions *e* gearing into racks *e'* cut in the under side of the wedges, having loose cranks or wrenches applied to the shafts of the pinions, and also ratchets and pawls attached to them, to prevent the possibility of their moving back.

In fig. 5 the usual quoins $a^{\times}$ are employed, driven by a shooting-stick.

The advantages of this method of securing type to rotary beds will be apparent. It is durable, compact, perfectly safe, and the economy in time expended in locking up and changing the forms is considerable.

We do not wish to be understood as limiting the invention to any particular means for operating the wedge-plates or strips E C, because various means and devices may be used.

*Claims.*

What is claimed as the invention of RICHARD M. HOE, is—

1. The arrangement of the rules *a'*, provided with feet *a* fitted to grooves in the bed, and having plates or keys *b* fitted over the ledges *b'*, for holding columns of type in place upon the bed of the press, substantially as described.

2. In combination with the rules *a'*, constructed substantially as described, the wedge-strips B C D E, whether operated by screws, quoins, or equivalent devices, substantially as described and specified.

3. Constructing each series of wedges or inclines B C D E in a single piece, substantially as described and specified.

4. The combination with a type-revolving bed of the above-described method of securing type thereon, substantially as described and specified.

R. HOE & CO.

Witnesses:

EDWARD E. OSBORN,
CHS. DURGIN.